(12) United States Patent
Huang et al.

(10) Patent No.: US 9,936,342 B2
(45) Date of Patent: Apr. 3, 2018

(54) FLOOR LEVEL DETERMINATION

(71) Applicant: Apple Inc., Cupertino, CA (US)

(72) Inventors: Joseph Ding-Jiu Huang, Kingston (CA); Darin Tay, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 14/829,575

(22) Filed: Aug. 18, 2015

(65) Prior Publication Data
US 2016/0356593 A1    Dec. 8, 2016

Related U.S. Application Data

(60) Provisional application No. 62/172,002, filed on Jun. 5, 2015.

(51) Int. Cl.
| G06F 19/00 | (2011.01) |
| H04W 4/02 | (2018.01) |
| H04W 4/04 | (2009.01) |

(52) U.S. Cl.
CPC ............ *H04W 4/02* (2013.01); *H04W 4/043* (2013.01)

(58) Field of Classification Search
CPC ......... H04W 4/043; G01C 5/06; G01S 5/0263
USPC ........................................ 702/150, 182–185
See application file for complete search history.

(56) References Cited

U.S. PATENT DOCUMENTS

| 7,397,424 | B2 | 7/2008 | Houri |
| 7,856,234 | B2 | 12/2010 | Alizadeh-Shabdiz et al. |
| 7,899,583 | B2 | 3/2011 | Mendelson |
| 7,924,149 | B2 | 4/2011 | Mendelson |
| 8,054,219 | B2 | 11/2011 | Alizadeh-Shabdiz |
| 8,223,074 | B2 | 7/2012 | Alizadeh-Shabdiz |
| 8,369,264 | B2 | 2/2013 | Brachet et al. |
| 8,478,297 | B2 | 7/2013 | Morgan et al. |
| 8,836,580 | B2 | 9/2014 | Mendelson |
| 8,866,673 | B2 | 10/2014 | Mendelson |
| 8,896,485 | B2 | 11/2014 | Mendelson |
| 8,941,485 | B1 | 1/2015 | Mendelson |
| 8,983,493 | B2 | 3/2015 | Brachet et al. |
| 9,020,687 | B2 | 4/2015 | Mendelson |
| 9,204,251 | B1 | 12/2015 | Mendelson |
| 9,204,257 | B1 | 12/2015 | Mendelson |
| 2006/0100782 | A1* | 5/2006 | Levi ....................... G01C 5/06 701/468 |
| 2011/0306354 | A1 | 12/2011 | Ledlie et al. |
| 2012/0064855 | A1 | 3/2012 | Mendelson |
| 2012/0072106 | A1 | 3/2012 | Han et al. |
| 2013/0281111 | A1 | 10/2013 | Syrjarinne et al. |
| 2014/0226503 | A1 | 8/2014 | Cooper et al. |

* cited by examiner

*Primary Examiner* — Edward Raymond
(74) *Attorney, Agent, or Firm* — Fish & Richardson P.C.

(57) ABSTRACT

Methods, systems, and computer program product for determining a building floor level are described. A mobile device can use wireless signal sources and location fingerprint data to determine a level of a building floor on which the mobile device is located. The location fingerprint data can include or be associated with a list and a count of wireless signal sources previously detected on each floor. The mobile device can compare the list and count with wireless signal sources detected by the mobile device, and use results of the comparison to configure a statistical filter that determines a location of the mobile device. The mobile device can then determine the location, including a building floor level, using the statistical filter.

20 Claims, 11 Drawing Sheets

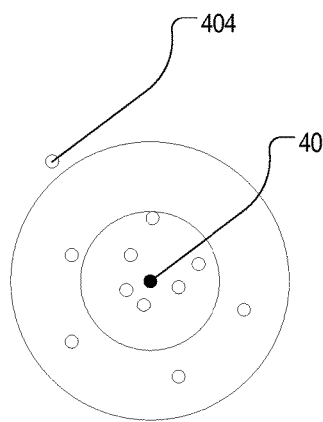
FIG. 4A
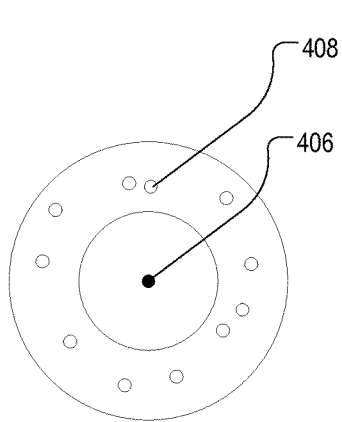
FIG. 4B
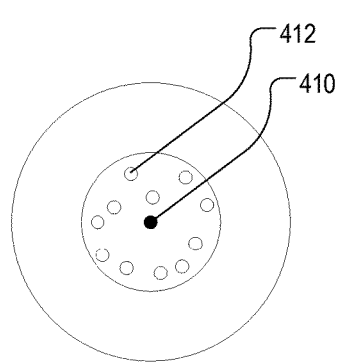
FIG. 4C
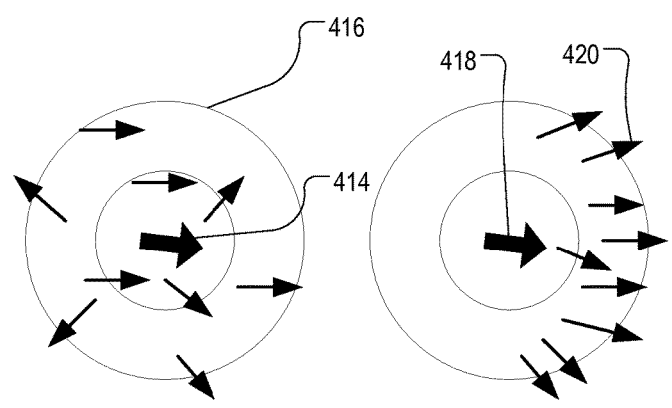
FIG. 4D
FIG. 4E
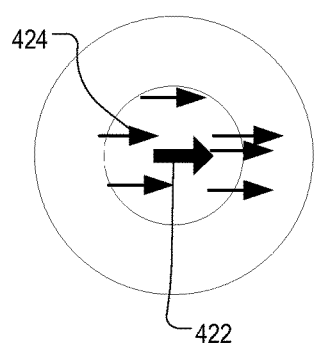
FIG. 4F

FLOOR LEVEL DETERMINATION

CROSS-REFERENCE TO RELATED APPLICATION

This application claims priority to U.S. Provisional Patent Application No. 62/172,002, entitled "Floor Level Determination," filed Jun. 5, 2015, the entire contents of which are incorporated herein by reference.

TECHNICAL FIELD

This disclosure relates generally to location determination.

BACKGROUND

People often carry mobile devices to a venue (e.g., a building) where a pedestrian can access. The venue can have multiple floors. People may want to use their mobile devices to determine on which floor they are located. People may want their mobile devices to display a floor plan of that floor, without having to enter a floor number. Inside the building, determining a floor using global navigation satellite system (GNSS) signals may be impractical due to signal weakness or signal obstruction. An altitude determined using barometer readings may also be insufficiently accurate or certain to determine a floor level, due to measurement uncertainties and atmospheric instabilities.

SUMMARY

Techniques for determining a building floor level are described. A mobile device can use wireless signal sources and location fingerprint data to determine a level of a building floor on which the mobile device is located. The location fingerprint data can include or be associated with a list and a count of wireless signal sources previously detected on each floor. The mobile device can compare the list and count with wireless signal sources detected by the mobile device, and use results of the comparison to configure a statistical filter that determines a location of the mobile device. The mobile device can then determine the location, including a building floor level, using the statistical filter.

The features described in this specification can be implemented to achieve various advantages. For example, compared to conventional location determination that outputs two-dimensional coordinates, the techniques described can provide a third dimension. This dimension can corresponding to building floors rather than mere altitudes. The techniques described in this specification can therefore generate a more practical and intuitive estimate of a location inside a venue. As a result, the techniques may provide better user experience when the user navigates inside a venue using the mobile device. For example, the mobile device can automatically display a floor plan for a user without having to request the user to input a floor level. The mobile device can display contextually relevant information to the user based on not only a latitude and longitude position but also a floor level. The mobile device can provide route guidance to a location on a different floor, using the floor determination to provide the routing information.

The details of one or more implementations of the techniques are set forth in the accompanying drawings and the description below. Other features, aspects and advantages of the indoor location survey techniques will become apparent from the description, the drawings and the claims.

BRIEF DESCRIPTION OF THE DRAWINGS

FIGS. 4A-4F illustrate example models for configuring a particle filter used in floor level determination.

Like reference symbols in the various drawings indicate like elements.

DETAILED DESCRIPTION

Example Location Estimation

Figure 1:
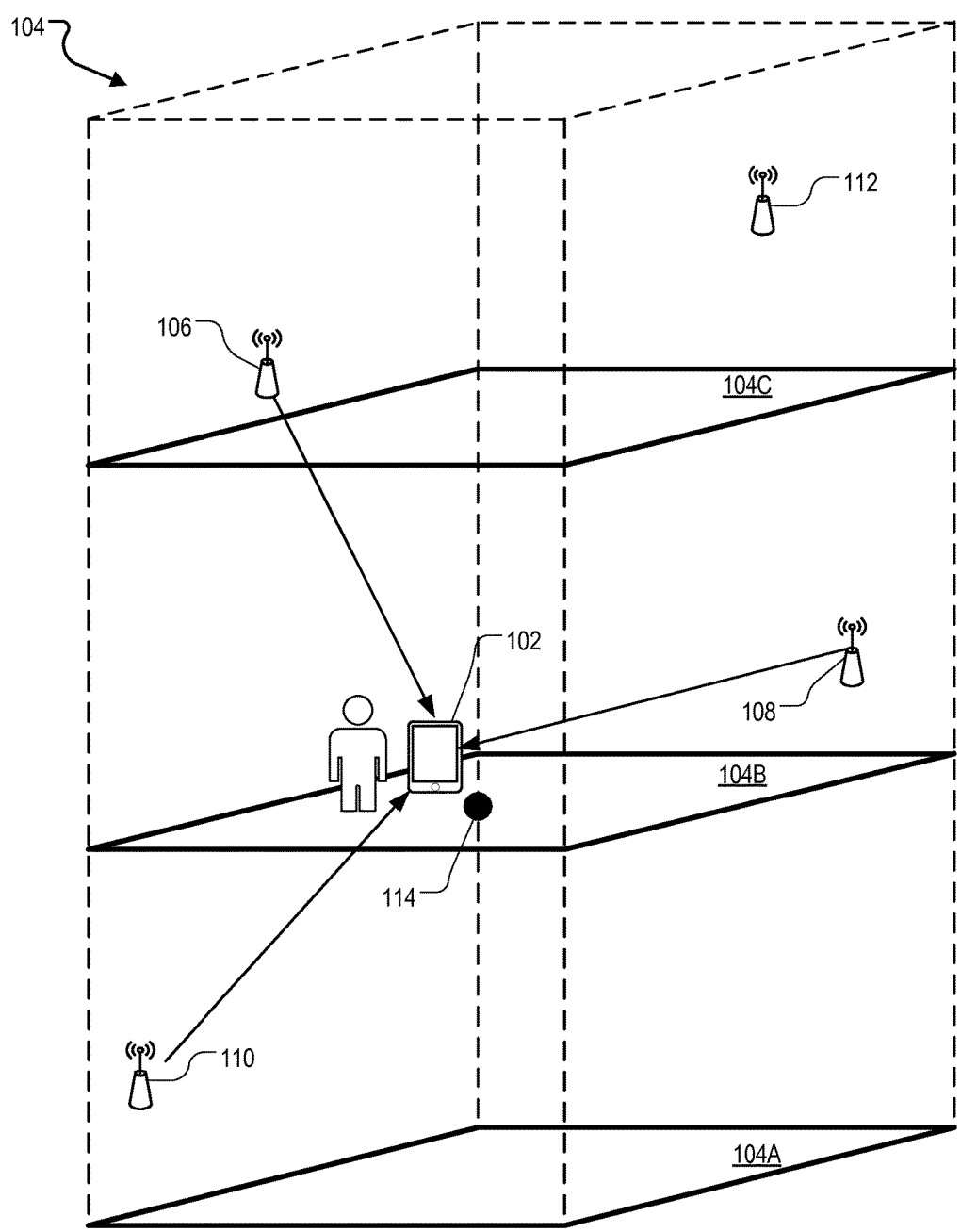
FIG. 1 is a diagram illustrating example floor level determination techniques.

FIG. 1 is a diagram illustrating example floor level determination techniques. Mobile device 102 can be a device implementing features of floor level determination. Mobile device 102 can be carried by a user at venue 104. Mobile device 102 can be programmed to determine on which floor mobile device 102 is located inside venue 104. The user can be a human. The user can be a vehicle programmed to move around in venue 104.

Venue 104 can be a structured space accessible by a pedestrian. The structure of venue 104 can include one or more constraints limiting a user's movement in the space. For example, venue 104 can have multiple floors. Each floor can be a story of a building. For convenience, three levels of physical floors (floors 104A, 104B and 104C) are shown in FIG. 1. Each floor can have a floor level (e.g., L1, L2 or L3) identifying the floor. A floor level of mobile device 102 can indicate on which of floors 104A, 104B or 104C mobile device 102 is located.

Initially, mobile device 102 may have no information indicating on which floor mobile device 102 is located. Mobile device 102 can determine a floor level of mobile device 102 using wireless signals detected by mobile device 102. Multiple signal sources can be detected in venue 104. In the example shown, mobile device 102 can detect signal sources 106, 108, 110 and 112 at various locations in venue 104. Signal sources 106, 108, 110 and 112 can be radio frequency (RF) transmitters located inside or outside of venue 104. For example, signal sources 106, 108, 110 and 112 can be Wi-Fi™ access points, Bluetooth™ devices or other wireless beacons.

Due to the physical structure of venue 104, not all signal sources 106, 108, 110 and 112 can be detected at every location on every floor in venue 104. In particular, on different floors, different signal sources can be detectable. For example, mobile device 102 is located on floor 104B. Mobile device 102 can detect signal sources 106, 108 and 110. On floor 104B, mobile device 102 fails to detect signal source 112. Mobile device 102 may detect signal sources 110 and 112 on floor 104C, but not other signal sources.

Each of signal sources 106, 108 and 110 may transmit an identifier. The identifier can be, for example, a respective media access control (MAC) address for each signal source. Mobile device 102 can detect the identifiers from received signals. Mobile device 102 can compare the identifiers with floor survey data stored on mobile device 102. The floor survey data can be provided by a survey device that previously visited venue 104 and recorded signals the survey device detected. The floor survey data can include identifiers of floor levels, e.g., L1, L2 and L3, corresponding to floors 104A, 104B and 104C, respectively. The floor survey data can include identifiers of signal sources previously detected on each floor. Based on the comparison, mobile device 102 can determine a respective probability score that mobile device 102 is located on each of floor 104A, 104B or 104C. For example, the probability score can be 0.4, 0.4 and 0.2, respectively. Example techniques of calculating the probability score are described in reference to FIG. 3.

Mobile device 102 can apply the probability scores to a state space model to determine a location of mobile device 102 in venue 104. The state space model can include a particle filter. Examples of the state space model are provided below in reference to FIG. 5. Mobile device 102 can use the probability scores to configure the state space model.

Configuring the state space model can include designating one or more candidate locations of mobile device 102 as a particle for the particle filter. Mobile device 102 can designate different numbers of candidate locations to floors associated with different probability scores. If mobile device 102 is more likely to be on a particular floor, mobile device 102 can put more weight on determining a location on that floor. Accordingly, a higher probability score can correspond to more candidate locations on that floor. For example, based on the probability scores of 0.4, 0.4 and 0.2, mobile device 102 can designate approximately the same number of candidate locations for floors 104A and 104B, subject to random fluctuation. Mobile device 102 can designate approximately half as many candidate locations for floor 104C. In some implementations, the number of candidate locations can also correspond to other factors including floor size and GNSS location estimate.

Mobile device 102 can then determine a location of mobile device 102, including a floor level of mobile device 102, by calculating a probability distribution of the candidate locations. Mobile device 102 can then estimate a location of mobile device 102. Mobile device 102 can determine the most likely location using the particle filter, observations made by mobile device 102, and the motion sensor information. Mobile device 102 can designate the candidate locations as samples for propagation in the particle filter. Mobile device 102 can determine a probability density of the candidate locations in a portion of venue 104, e.g., on floors 104A, 104B and 104C. Mobile device 102 can display a representation of the location on a map of that particular floor, e.g., as a marker.

Having obtained a floor level estimate for a given time k, mobile device 102 can determine a floor level estimate for a next time k+1, where k is a given point in time, k+1 is a unit time (e.g., one second or five seconds) after k in time. For example, mobile device 102 can determine that at time k, mobile device is located on floor 104B. To estimate a floor level of mobile device at time k+1, mobile device 102 can use historical information to adjust the particle filter configuration.

In some implementations, mobile device 102 can use a Poisson process to determine a floor transition. After any given time step (at time k+1), mobile device 102 can determine that there is some probability that the user has transitioned between floors. Mobile device 102 can model the transition by having a probability of a particle representing a hypothesis of changing floors at each time step. Mobile device 102 can compare a duration that mobile device 102 has stayed on floor 104B with an average time a user stays on floor 104B according to historical data. Mobile device 102 can determine a likelihood that mobile device 102 changes floors based on the comparison, where, for example, if the duration is longer than the average time, the higher the likelihood.

In addition, mobile device 102 can use map constraints to determine a floor level estimate for a next time k+1. For example, mobile device 102 can determine that mobile device 102 is at location 114 at floor 104B at time k. Based on map data of venue 104, mobile device 102 can determine that a portion of venue 104 at floor 104A that is directly below location 114 is solid and impassible by a pedestrian. For example, that portion can be a column or a wall. Mobile device 102 can then determine that at time k+1, mobile device cannot be on floor 104A. This is based on the assumption that a pedestrian can move vertically without horizontal movement only in elevators, and that an elevator cannot run into a wall. Additionally, if the map data contains information about the location of floor-transition points (e.g., stairs, elevators or ramps), mobile device 102 can use an estimated proximity of mobile device 102 to such floor-transition points to increase the likelihood of a floor transition.

In addition, upon determining that mobile device 102 is at location 114 at time k, mobile device 102 can use other sensors of mobile device 102 to estimate floor level at time k+1. The sensors can include, for example, accelerometers, gyroscopes and barometers. Mobile device 102 can use an accelerometer and a gyroscope to determine a heading and velocity of mobile device 102. Mobile device 102 can use a barometer to determine altitude change. Based on whether the altitude increases or decreases, mobile device can determine whether mobile device 102 is going to a higher floor level or a lower floor level. Mobile device 102 can use the state space model to fuse the heading, velocity, and altitude change and wireless measurement to determine floor level at time k+1.

Example Floor Survey Data Generation

Figure 2:
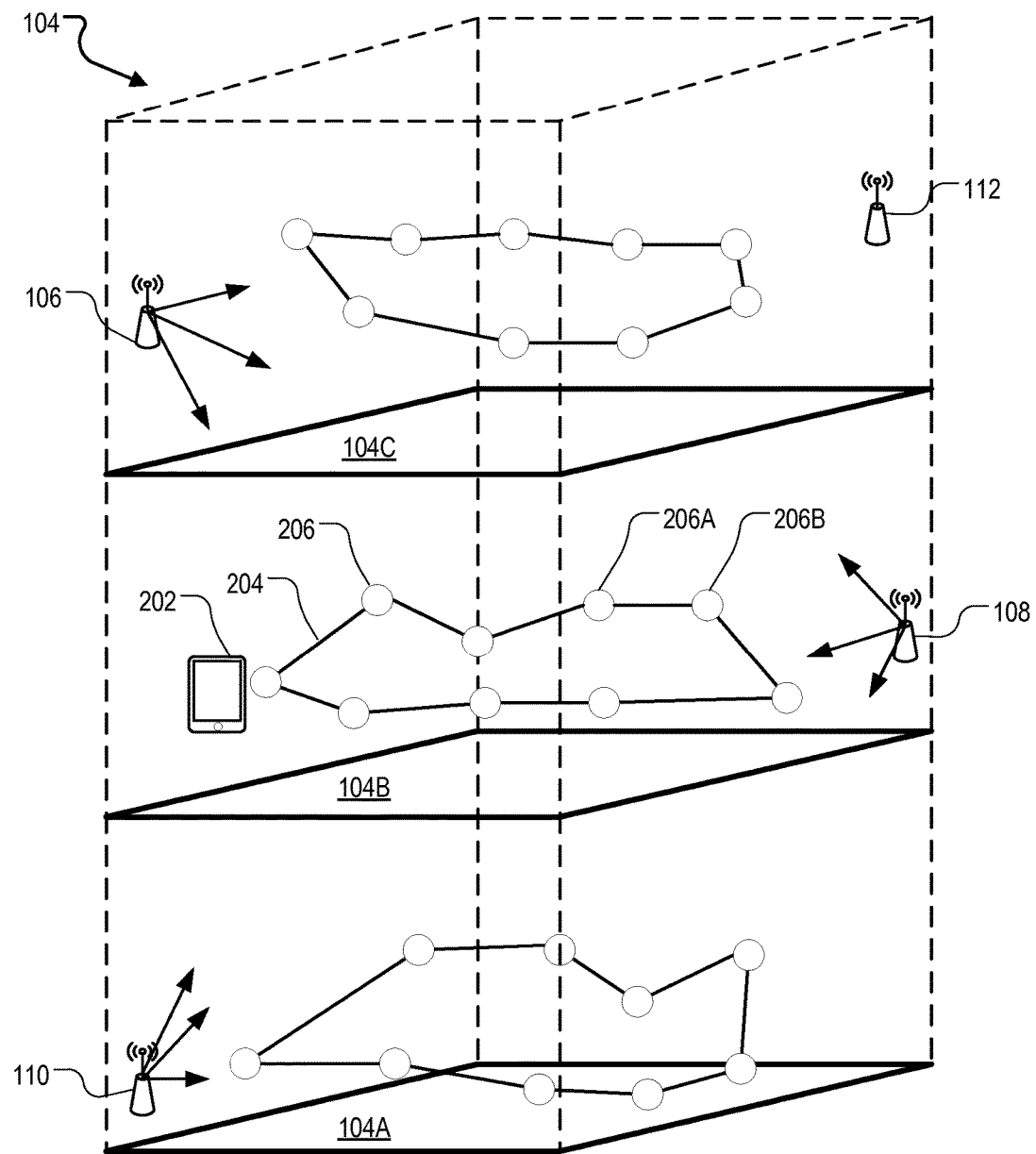
FIG. 2 illustrates example techniques for generating floor survey data for floor level determination.

FIG. 2 illustrates example techniques for generating floor survey data for floor level determination. Floor survey data of venue 104 can be associated with, or be part of, a location fingerprint of venue 104. A location fingerprint of venue 104 can include expected signal measurements at various locations inside venue 104. Floor survey data of venue 104 can be generated by a location server, or by survey device 202. Survey device 202 can be a mobile device configured to perform a survey of venue 104.

Survey device 202 can perform the survey by recording measurements of signal sources at various locations on each floor of venue 104. For example, survey device 202 can be carried by a surveyor. The surveyor can move along path 204 on a floor of venue 104. At the beginning of movement, survey device 202 can receive an input from the surveyor indicating the floor being surveyed. The input can include a floor identifier (e.g., "L2") identifying a floor level. Survey device 202 can then record measurements of signals from the signal sources at various locations 206 on path 204. Each location 206 is represented as a circle on path 204. The signal sources can include signal sources 106, 108, 110 and 112. The signals can include wireless signals encoding a respective identifier (e.g., MAC address) of each of signal sources 106, 108, 110 and 112. The measurements can include a respective received signal strength indicator (RSSI) of each signal detected. The surveyor can indicate locations 206 by pointing out each of locations 206 on a venue map displayed on survey device 202. Each of locations 206 can then be associated with the RSSIs measured at that location.

Survey device 202 may detect different number of radio frequency (RF) signal sources at different locations of locations 206. For example, while survey device 202 moves, survey device 202 may detect two signal sources in a scan at location 206A, three signal sources in another scan at location 206B, etc. Upon completion of surveying a particular floor (e.g., floor 104B), survey device 202 can store a list of identifiers of signal sources detected on that floor at various locations 206 in association with the floor identifier. Survey device 202 can record the minimum number of signal sources detected at each of locations 206, and a mean number of signal sources detected at locations 206. Survey device 202 can designate the data including floor identifier, list of signal source identifiers, minimum number of signal sources, and mean number of signal sources as a floor summary for floor 104B.

Likewise, survey device 202 can survey other floors including floors 104A and 104C of venue 104. Survey device 202 can generate a floor summary for each floor surveyed. Survey device 202 can designate the floor summaries as floor survey data for venue 104. Survey device 202 can provide the floor survey data to a location server for distributing to a mobile device (e.g., mobile device 102) for determining a floor level in venue 104.

Figure 3:
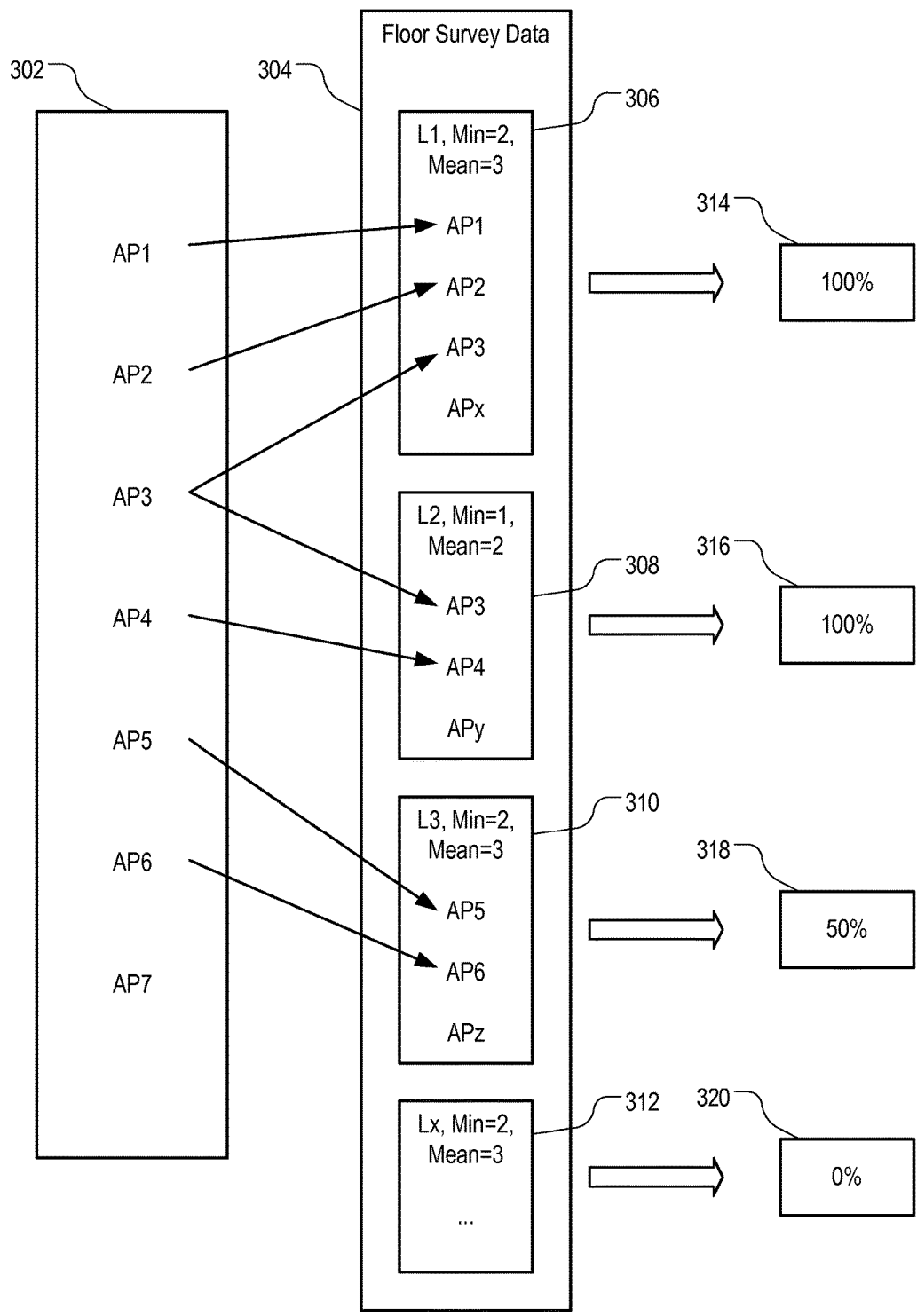
FIG. 3 illustrates example floor matching in floor level determination.

FIG. 3 illustrates example floor matching in floor level determination. During the process of determining a floor level, mobile device 102 can perform one or more wireless scans using an RF receiver. Mobile device 102 can determine signal source list 302 in a scan. In some implementations, mobile device 102 can determine signal source list 302 from multiple scans conducted in X seconds to reduce the possibility of accidentally missing a signal source. X can be a pre-specified number. Signal source list 302 can include a list of identifiers (e.g., MAC addresses) of signal sources detected in the scan. In the example shown, the list can include identifiers AP1, AP2 . . . AP7.

Mobile device 102 can compare signal source list 302 with floor survey data 304 in determining a floor level. Mobile device 102 can receive floor survey data 304 from a location server. Mobile device 102 can obtain floor summaries 306, 308, 310 and 312 from floor survey data 304. Each floor summary can include a floor identifier (L1, L2, L3 and L4, respectively), a minimum number of signal sources, a mean number of signal sources, and a list of signal source identifiers previously determined by a survey device (e.g., survey device 202).

Mobile device 102 can compare signal source list 302 with each of floor summaries 306, 308, 310 and 312 to determine matching signal sources. Matching signal sources are signal sources that are detected by both mobile device 102 and by survey device 202. Mobile device 102 can determine, for each floor, how many signal sources in signal source list 302 are matching signal sources. For example, mobile device 102 can determine a number (N) of matching signal sources that are represented in both signal source list 302 and floor summary 306 by counting signal source identifiers that are in both signal source list 302 and floor summary 306. In the example shown, mobile device 102 can determine signal source identifiers AP1, AP2 and AP3 are matching signal sources that are included in both signal source list 302 and floor summary 306 (N=3, for floor L1).

Mobile device 102 determines from marginal probability 314 that mobile device 102 is located on a floor having an identifier L1 given the number N. To determine marginal probability 314, mobile device 102 can compare the number N with the mean number of detected signal sources in floor summary 306 and the minimum number of detected signal sources in floor summary 306. Upon determining that the number N is greater than or equal to the mean number of detected signal sources in floor summary 306, mobile device 102 can designate marginal probability 314 as 1.0 (100 percent). Upon determining that the number N is less than the mean number of detected signal sources in floor summary 306 but greater than or equal to the minimum number of detected signal sources in floor summary 306, mobile device 102 can designate marginal probability 314 as 0.5 (50 percent). Upon determining that the number N is less than the minimum number of detected signal sources in floor summary 306, mobile device 102 can designate marginal probability 314 as 0.0 (0 percent).

In the example shown, for floor summary 306, N=3 equals the mean number of detected signal sources. Accordingly, mobile device 102 can determine that marginal probability 314 for floor L1 is equal to 100 percent. Likewise, mobile device 102 can determine that marginal probabilities 316, 318 and 320, for floors L2, L3 and LX, respectively, are 100 percent, 50 percent and 0 percent, respectively.

Mobile device 102 can then determine a respective probability score for each floor based on marginal probabilities 314, 316, 318 and 320. Mobile device 102 can use the probability scores to configure particles of a particle filter. Mobile device 102 can determine the respective probability scores according to contribution of each individual marginal probability to the overall probability, using Bayes' rule. In the example shown, the overall probability is a sum of each marginal probability 314, 316, 318 and 320 (1.0+1.0+0.5+0=2.5). The respective contributions of probability scores are 1.0/2.5=0.4, 0.4, 0.2, and 0.0, respectively. Mobile device 102 can then assign a number of particles to each floor proportionally to each probability score.

FIGS. 4A-4F illustrate example models for configuring a particle filter used in location estimation. FIG. 4A illustrates a location estimation in a simplest version. Mobile device 102 can add Gaussian random noise to each particle with a fixed variance per unit time. Particle 402, represented as a solid dot in FIG. 4A, is a particle at time k. Particles 404, each represented as a circle, are particles at time k+1, which is a unit time after time k. Mobile device 102 can then filter the particles 404 using an observation that includes measurements of signals as recorded by a receiver. In particular, mobile device 102 can allocate particles 404 to various floors according to the probability scores of the floors.

FIG. 4B illustrates a location estimation where mobile device 102 has pedometer information indicating that a user of mobile device 102 is walking Mobile device 102 can add small Gaussian random noise where a Laplacian is set at stride length. Mobile device 102 can distribute the small Gaussian random noise to various floors according to the respective probability scores. Particle 406 is a particle at time k. Particles 408 are particles at time k+1. Particles 406 can be on different floors.

FIG. 4C illustrates a location estimation where mobile device 102 has pedometer information indicating that a user of mobile device 102 is not walking Mobile device 102 can add a small amount of Gaussian random noise to the particles with a fixed variance per unit time. Mobile device 102 can distribute the Gaussian random noise to various floors according to the respective probability scores. Particle 410 is a particle at time k. Particles 412 are particles at time k+1. Particles 412 can be on different floors.

FIG. 4D illustrates motion and prediction where mobile device 102 has pedometer information. Mobile device 102 may not have specific information on whether a user of mobile device 102 is walking or is stationary. Mobile device 102 can add Gaussian random noise to each particle with a fixed variance per unit time, as well as a distributed heading change. Mobile device 102 can distribute the Gaussian random noise to various floors according to the respective probability scores. Particle 414 is a particle at time k. Particle 414 is associated with a heading, represented in FIG. 4D as an arrow. Particles 416, each represented by an arrow indicating a respective heading, are particles at time k+1. Particles 416 can be on different floors.

FIG. 4E illustrates motion and prediction where mobile device 102 has pedometer information and heading information. The pedometer information can indicate that mobile device 102 is being carried by a user who is walking at time k. The heading information can be obtained from a sensor, such as a magnetometer, accelerometer and/or gyro. The heading information can indicate a heading of mobile device 102 at time k. Mobile device 102 can add truncated Gaussian random noise to each particle with a fixed variance per unit time, as well as a distributed heading change. Mobile device 102 can truncate Gaussian random noise in the heading of mobile device 102. Mobile device 102 can distribute the particles as the truncated Gaussian random noise to various floors according to the respective probability scores. Particle 418 is a particle at time k. Particles 420 are associated with a heading, represented in FIG. 4E as an arrow. Particles 420 may be placed on different floors.

FIG. 4F illustrates motion and prediction where a mobile device has pedometer information and heading information. The pedometer information can indicate that mobile device 102 is stationary at time k. Mobile device 102 can add a small Gaussian random noise to each particle with a fixed variance per unit time, as well as a fixed heading that corresponds to the heading of mobile device 102 at time k. Mobile device 102 can distribute particles as the small Gaussian random noise to various floors according to the respective probability scores. Particle 422 is a particle at time k. Particles 424 are particles at time k+1. Particles 424 may be placed on different floors.

Example Device

Figure 5:
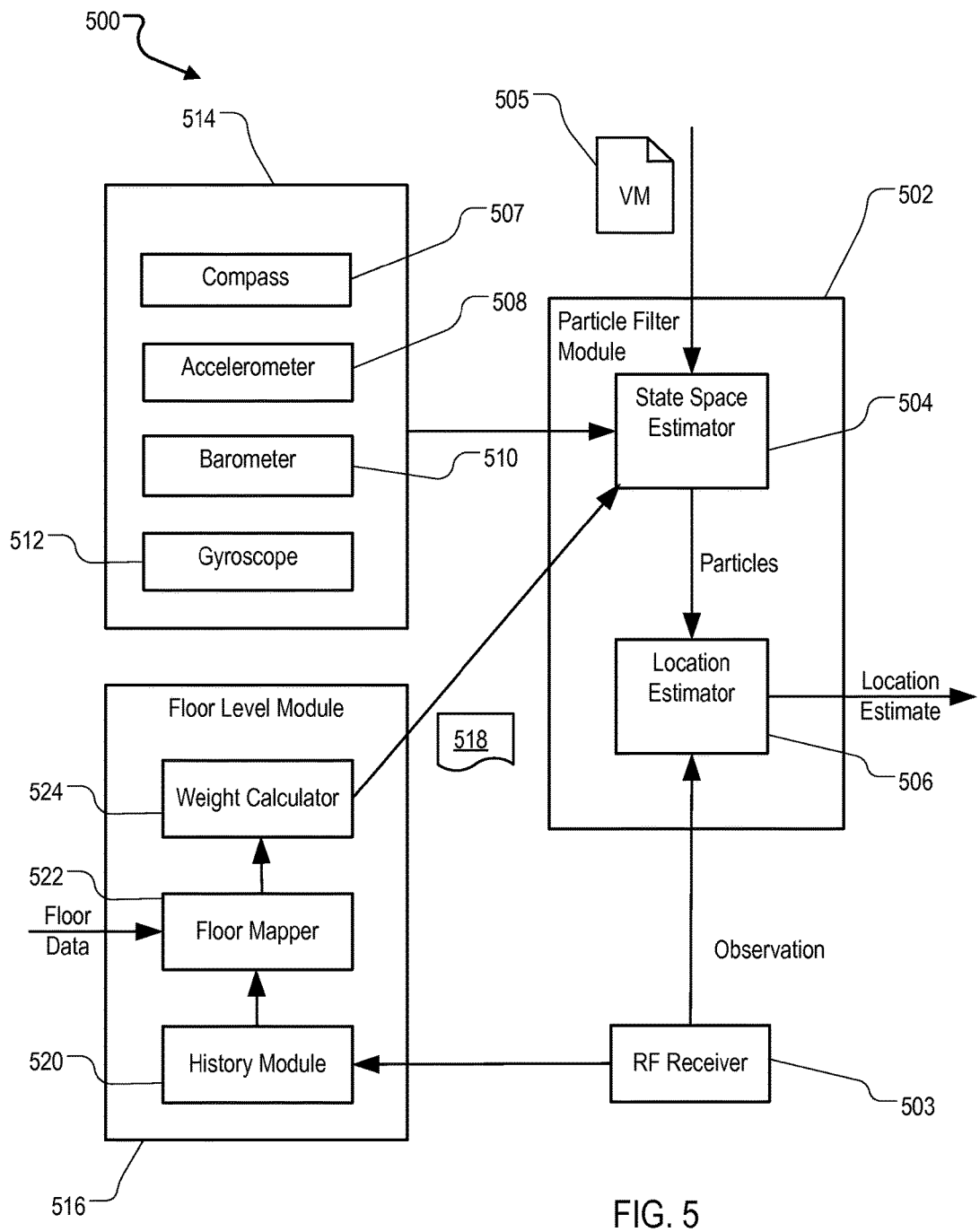
FIG. 5 is a block diagram illustrating components of an example location estimation subsystem of a mobile device.

FIG. 5 is a block diagram illustrating components of example location estimation subsystem 500 of mobile device 102.

Mobile device 102 can use available information to estimate a location in venue 104. The available information can include, for example, motion models, motion measurements, environmental constraints, floor survey data, and map constraints. Mobile device 102 can then use a state space model to fuse available information from different information sources.

The state space model can be a simulation-based estimation model, e.g., a particle filter. Mobile device 102 can estimate a probability density of current locations $X_k$ of mobile device 102 using the particle filter based on a previous location $X_{k-1}$ conditioned upon a current observation $Z_k$, where k is a given point in time, k−1 is a point prior to k in time. Observation $Z_k$ can include one or more sensor readings at time k. The sensor readings can include RSSI readings, motion sensor readings and barometer readings. The time length between k and k−1 can be configurable (e.g., one second or five seconds). RF receiver 503 can be a component of mobile device 102 configured to provide at least a portion of observation $Z_k$.

Particle filter module 502 can include state space estimator 504. State space estimator 504 can be configured to receive available information and include the available information into location estimator 506, which is a component of particle filter module 502 configured to provide a location estimate.

State space estimator 504 can receive, from a storage device of a location server or of mobile device 102, venue map 505 including data on structural constraints (e.g., walls, doors) in the venue. Using the venue map data, state space estimator 504 can determine whether or not a pedestrian can transition through a structural constraint. State space estimator 504 can determine a likelihood where the pedestrian may move within a given time interval, given limited motion speed of the pedestrian.

State space estimator 504 can receive or determine, from sensors 514, a motion context. The motion context can include readings of sensors 514. Sensors 514 can include micro-electromechanical systems (MEMS) of mobile device 102. For example, sensors 514 can include magnetometer 507 configured to determine a direction of a pedestrian's heading, accelerometer 508 configured to determine whether a pedestrian's movement is walking or running, a pace of the movement, and a stride of the movement. Sensors 514 can include barometer 510 configured to determine whether a pedestrian is moving vertically (e.g., in an elevator or on stairs) based on air pressure. Sensors 514 can include gyroscope 512 configured to determine whether a pedestrian is turning.

Based on the motion context, state space estimator 504 can determine if a pedestrian carrying mobile device 102 is stationary or non-stationary. If state space estimator 504 determines that the pedestrian is stationary, state space estimator 504 can configure location estimator 506 using state space system noise (e.g., random locations). If state space estimator 504 determines that the pedestrian is non-stationary, state space estimator 504 can configure location estimator 506 using the speed of the pedestrian to drive a state space update of location estimator 506.

State space estimator 504 can determine attitude information based on the motion context data received from sensors 514. The attitude information can include a heading of the pedestrian determined using a series of motion context data received from sensors 514. State space estimator 504 can receive the series of motion context data over time, and estimate a heading based on the series of motion context data using a filter configured to use a series of measurements observed over time to produce estimates of unknown variables.

State space estimator 504 can receive, from floor level module 516, floor selection weight 518. Floor selection weight 518 can include a respective weight for selecting particles for each floor level of a venue. Floor level module 516 is a component of location estimation subsystem 500 configure to determine floor selection weight 518 from readings of RF receiver 503. Floor level module 516 can include history module 520. History module 520 is a component of floor level module 516 configured to receive signal source identifiers from RF receiver 503, and determine signal source list 302 from a period of X seconds. Floor level module 516 can include floor mapper 522. Floor mapper 522 is a component of floor level module 516 configured to compare signal source list 302 with floor survey data 304 to determine matching signal sources for each floor, determine a marginal probability for each floor level, and determine a respective probability score for each floor. Floor mapper 522 can then provide the probability scores to weight calculator 524.

Weight calculator 524 is a component of floor level module 516 to determine floor selection weight 518. In some implementations, weight calculator 524 can designate the probability scores as floor selection weight 518. In some implementations, weight calculator 524 can adjust the probability scores by area of each floor, where the selection weight is increased for a floor level that has a larger area. In some implementations, weight calculator 524 can adjust the probability scores by GNSS location uncertainty, where a GNSS fix that has a larger uncertainty radius increases the weight. Weight calculator 524 can then provide the calculated floor selection weight 518 to state space estimator 504.

Based on the map constraints, the motion context, the attitude information and floor selection weight 518, state space estimator 504 can determine candidate locations of mobile device 102. State space estimator 504 can designate the candidate locations as particles for propagation in particle filter $P(X_k|X_{k-1})$, where $X_k$ represents current candidate locations of mobile device 102 at time k, $X_{k-1}$ represents previous locations at time k–1. Propagating the particle filter can include applying the available information, including venue map 505, motion context, attitude information and floor selection weight 518 to the particle filter to determine the probability density of the candidate locations in at least a portion of the venue, given previous locations. Propagating the particle filter can be based on a stochastic process to explore some or all potential constraints. In some implementations, the stochastic process can be a discretized Wiener process. Propagating the particle filter can be subject to a multi-dimensional correlation function based on availability of the constraints.

State space estimator 504 can detect particle depletion when a number of candidate locations fall below a threshold number sufficient for a probability density calculation. Upon such detection, state space estimator 504 can perform a parallel resampling of a portion of venue 104 or the entirety of venue 104 to recover from filter divergence.

Upon propagating the particle filter, state space estimator 504 can provide the particle filter to location estimator 506 for update. Location estimator 506 can update the particle filter using a location observation received from one or more wireless receivers. The location observation can be subject to a measurement model having a given system uncertainty. Updating the particle filter can include calculating probability density $P(X_k|X_{k-1}, Z_k)$ where $Z_k$ is an observation at time k. Location estimator 506 can then determine a current location, including a current floor level, of mobile device 102 (location at time k) using the probability density, including designating a most likely location of mobile device 102 as the current location of mobile device 102 in venue 104.

Figure 6:
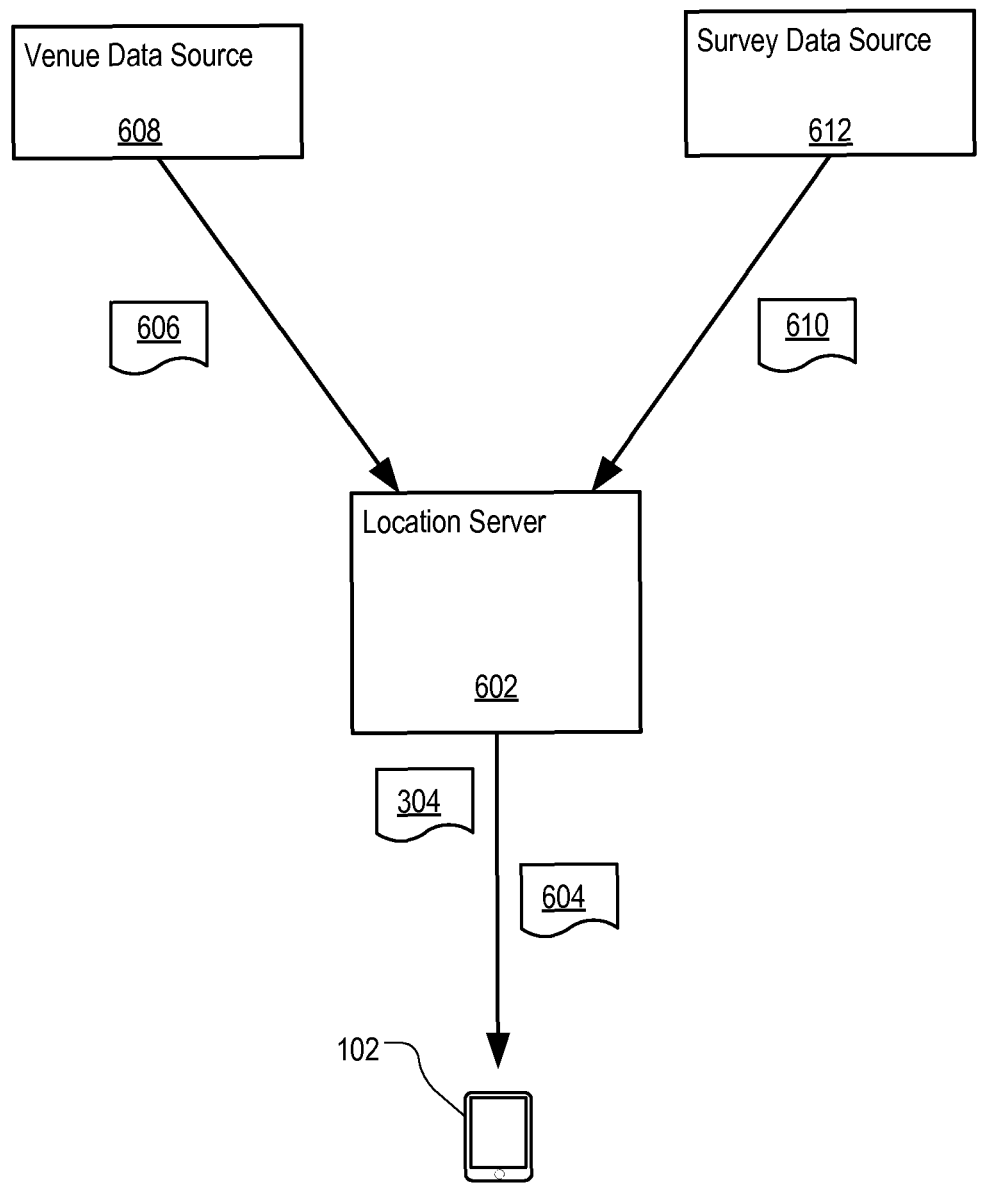
FIG. 6 is a block diagram illustrating example data flow.

FIG. 6 is a block diagram illustrating example data flow. Location server 602 can include one or more computers configured to provide floor survey data 304 and location fingerprint data 604 to mobile device 102, and can have the architecture described in reference to FIG. 11. Location server 602 can receive venue map 606 from venue data source 608. Venue map 606 can include a respective floor plan for each floor of a venue, e.g., a respective map of each of floors 104A, 104B and 104C of venue 104. Venue map 606 can include representations of structural features in the venue, including for example, locations and sizes of walls, columns and other inaccessible features.

Location server 602 can receive survey data 610 from survey data source 612. Survey data 610 can be created by survey data source 612 based on surveys of venue 104. Survey data source 612 can aggregate survey data, including floor survey data, from multiple survey devices including survey device 202.

Location server 602 can determine location fingerprint data 604 from the venue map 606 and survey data 304. Location fingerprint data 604 can include expected RF signal measurements at various locations on each floor inside venue 104. Location server 602 can provide floor survey data 304 and location fingerprint data 604 to mobile device 102 for location estimation.

Example User Interface

Figure 7:
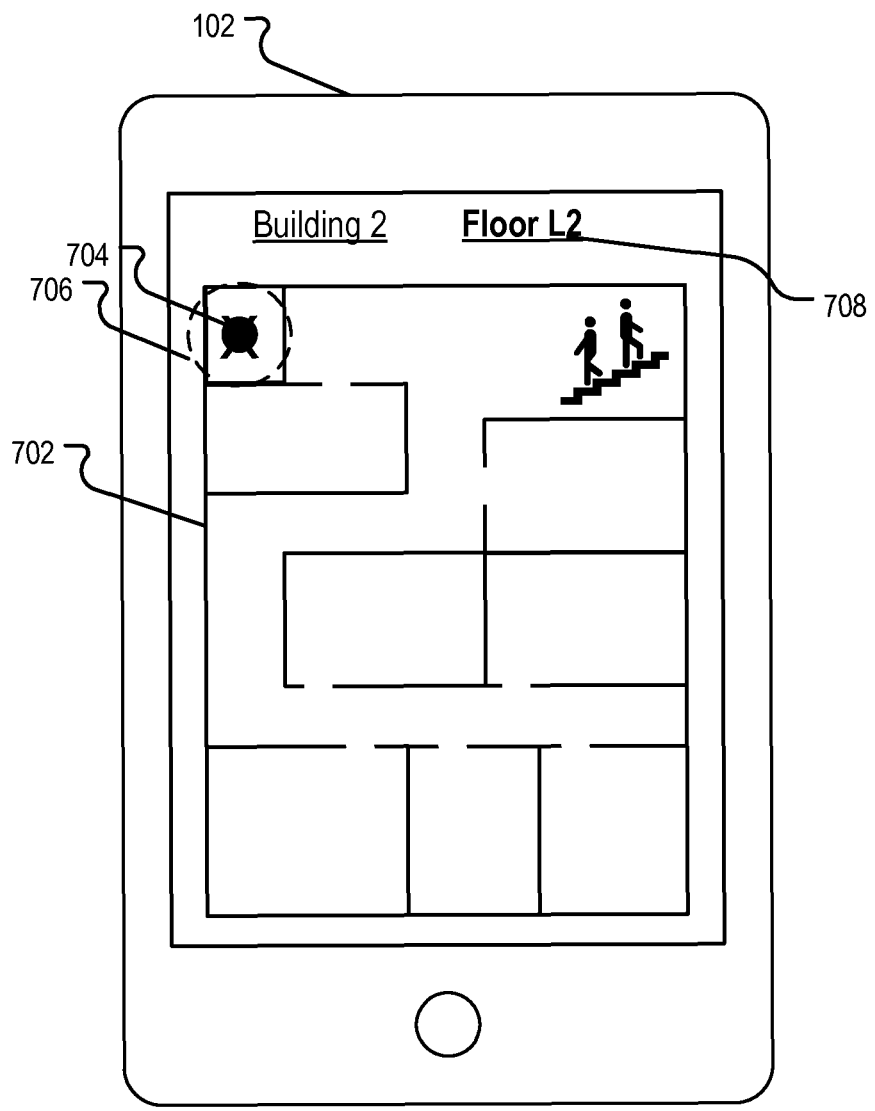
FIG. 7 is an example user interface for displaying a floor map on a mobile device.

FIG. 7 is an example user interface for displaying a floor map on mobile device 102. Mobile device 102 can move up and down between floors 104A, 104B and 104C, as shown in FIG. 1. For example, mobile device 102 can move in an elevator or on stairs.

While mobile device 102 moves between floors, mobile device 102 can determine a location of mobile device 102 in venue 104, and determine a floor level on which mobile device 102 is located. While mobile device 102 moves up or down, mobile device 102 can display map 702 of venue 104. Map 702 can include a floor plan of a current floor level (e.g., floor level L2) of mobile device 102. Mobile device 102 can display marker 704 indicating the location, and uncertainty indicator 706 to indicate a radius of uncertainty of the location. Upon determining mobile device 102 moved up or down to a different floor, mobile device 102 can automatically update map 702 to display a new floor plan.

For example, if mobile device 102 determines that mobile device 102 has moved in an elevator from floor L2 to L3, mobile device 102 can update map 702 to display a floor plan of floor level L3. Updating map 702 can include updating label 708 to indicate that map 702 has changed to a new floor plan. The updating can be automatic and without user input.

Example Procedures

Figure 8:
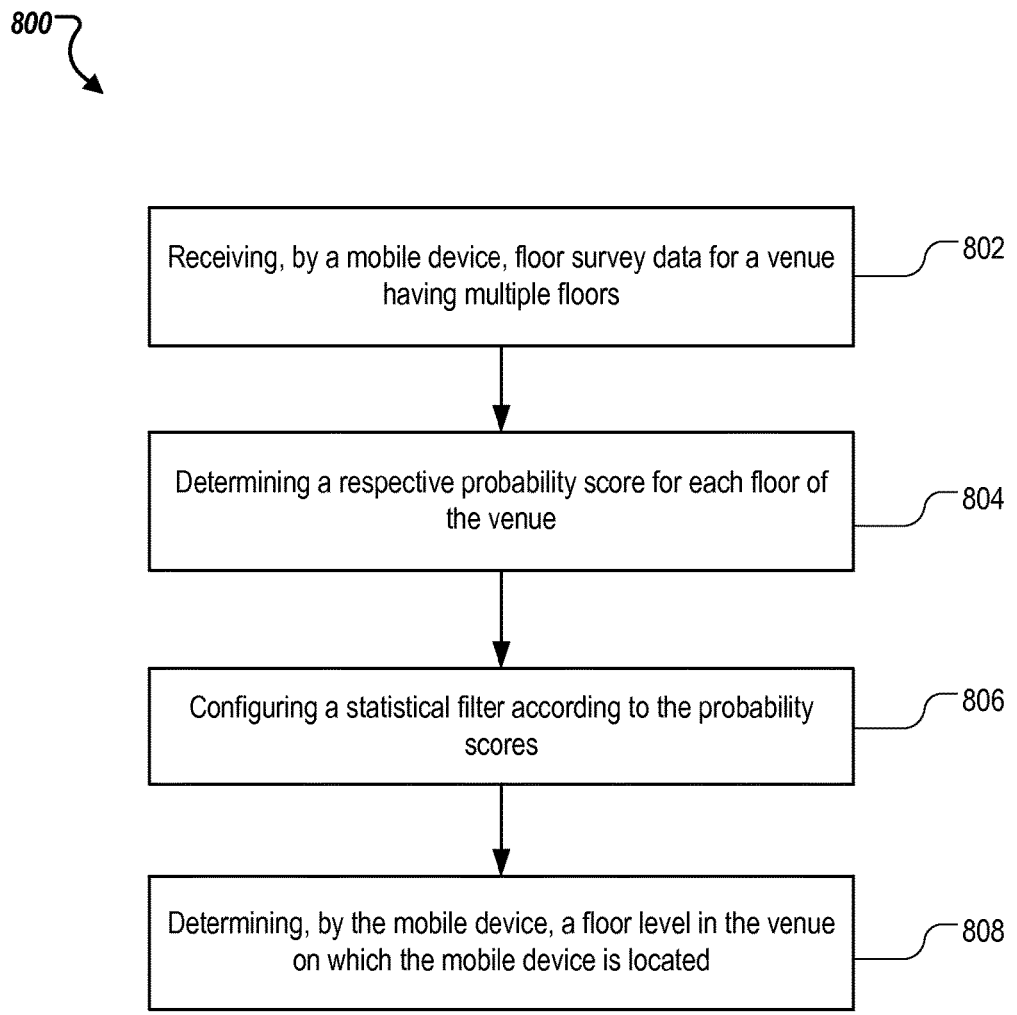
FIG. 8 is a flowchart of an example process of determining a floor level.

FIG. 8 is a flowchart of an example process 800 of determining a floor level. Process 800 can be performed by mobile device including one or more processors, e.g., mobile device 102. An example architecture for mobile device 102 is described in reference to FIG. 9.

Mobile device 102 can receive (802) floor survey data for a venue. The venue can include multiple floors. The floor survey data can include a respective floor summary for each floor of the venue. Each floor summary can include a list of signal sources previously detected by a survey device (e.g., survey device 202) at the corresponding floor. Each list can be associated with statistical data representing a likely number of signal sources detected by the survey device on that floor during a survey. The statistical data can include a minimum number of signal sources detected by the survey device and an average number of signal sources detected by the survey device on that floor during a survey. Each signal source can be an RF transmitter, for example, a wireless access point or a Bluetooth™ device.

Mobile device 102 can determine (804) a respective probability score for each floor of the venue. The probability score for a floor can indicate a likelihood that mobile device 102 is located on that floor. To determine the probability score, mobile device 102 can compare a set of signal sources detected by mobile device 102 (e.g., signal source list 302) with each list of signal sources in the floor summaries. Mobile device 102 can determine each probability score based on a degree of match between the detected signal sources and each respective surveyed list of signal sources. Mobile device 102 can determine the degree of match be based on the minimum numbers of signal sources and the average number of signal sources in the floor summaries.

Comparing the set of detected signal sources with each list of surveyed signal sources can include performing the following operations. For each list, mobile device 102 can determine a number of matching signal sources. The matching signal sources are signal sources detected both in the survey and by mobile device 102. The matching signal sources are in both the list of surveyed signal sources and the set of detected signal sources. Mobile device 102 can then compare the number of matching signal sources with the minimum number of signal sources and the average number of signal sources in the floor summaries. Mobile device 102 can designate a first marginal probability value for the floor upon determining that the number of matching signal sources is greater than or equal to the average number of signal sources. Mobile device 102 can designate a second marginal probability value for the floor upon determining that the number of matching signal sources is less than the average number of signal sources but greater than or equal to the minimum number of signal sources. Mobile device 102 can designate a third marginal probability value for the floor upon determining that the number of matching signal sources is less than the minimum number of signal sources. The first marginal probability value (e.g., 1.0) is higher than the second marginal probability value (e.g., 0.5). The second marginal probability value is higher than the third marginal probability value (e.g., 0.0).

Mobile device 102 can configure (806) a statistical filter according to the probability scores. Mobile device 102 can provide more candidate locations to a floor that is associated with a higher probability score in configuring the statistical filter. The statistical filter can be a particle filter. To configure the statistical filter, mobile device 102 can compute a respective probability score for each floor based on the marginal probability values using Bayes' rule. The probability score for a floor can indicate a likelihood that mobile device 102 is located on that floor. Mobile device 102 can then designate, for the statistical filter, a number of candidate locations for a floor corresponding to the probability score for the floor. A higher probability score can correspond to a higher number of candidate locations designated for filtering. In some implementations, the number of candidate locations for a floor further corresponds to a location estimate. A larger size can correspond to a proportionally higher number of candidate locations.

Mobile device 102 can determine (808) a floor level in the venue on which the mobile device is located using the statistical filter and candidate locations on the floors in the venue. In some implementations, mobile device 102 can determine a change of floors based on a current floor level estimation and a likelihood of transiting from a current floor to a next floor. Mobile device 102 can display the floor level in a user interface, such as the user interface described in the example of FIG. 7. Mobile device 102 can present the floor level in various other ways, e.g., by an audio alert.

Example Mobile Device Architecture

Figure 9:
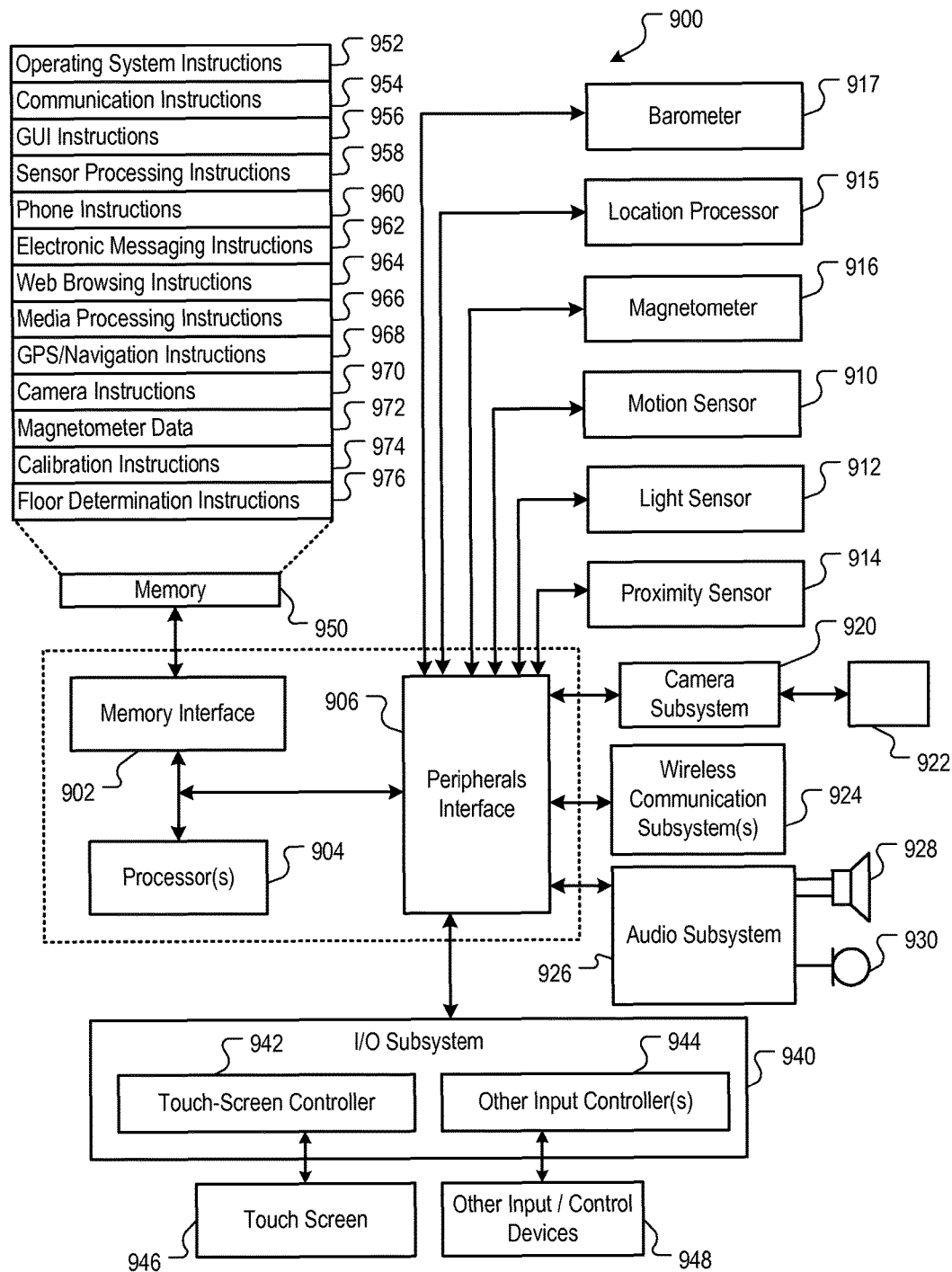
FIG. 9 is a block diagram illustrating an example device architecture of a mobile device implementing the features and operations described in reference to FIGS. 1-8.

FIG. 9 is a block diagram of an example architecture 900 for a mobile device . A mobile device (e.g., mobile device 102 or survey device 202) can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include application processors, baseband processors, and wireless processors. The various components in the mobile device, for example, can be coupled by one or more communication buses or signal lines.

Sensors, devices and subsystems can be coupled to peripherals interface 906 to facilitate multiple functionalities. For example, motion sensor 910, light sensor 912 and proximity sensor 914 can be coupled to peripherals interface 906 to facilitate orientation, lighting and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Motion sensor 910 can include one or more accelerometers configured to determine change of speed and direction of movement of the mobile device. Barometer 917 can include one or more devices connected to peripherals interface 906 and configured to measure pressure of atmosphere around the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi™ or WiMax™ network and a Bluetooth™ network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions. Audio subsystem 926 can be configured to receive voice commands from the user.

I/O subsystem 940 can include touch surface controller 942 and/or other input controller(s) 944. Touch surface controller 942 can be coupled to a touch surface 946 or pad. Touch surface 946 and touch surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 946. Touch surface 946 can include, for example, a touch screen.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch surface 946; and a pressing of the button for a second duration that is longer than the first duration may turn power to mobile device 102 on or off. The user may be able to customize a functionality of one or more of the buttons. The touch surface 946 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can store floor determination instructions 976 that, when executed, can cause processor 904 to perform floor level determination operations of example process 800 as described above in reference to FIG. 8.

Each of the above identified instructions and applications can correspond to a set of instructions for performing one or more functions described above. These instructions need not be implemented as separate software programs, procedures or modules. Memory 950 can include additional instructions or fewer instructions. Furthermore, various functions of the mobile device may be implemented in hardware and/or in software, including in one or more signal processing and/or application specific integrated circuits.

Example Operating Environment

Figure 10:
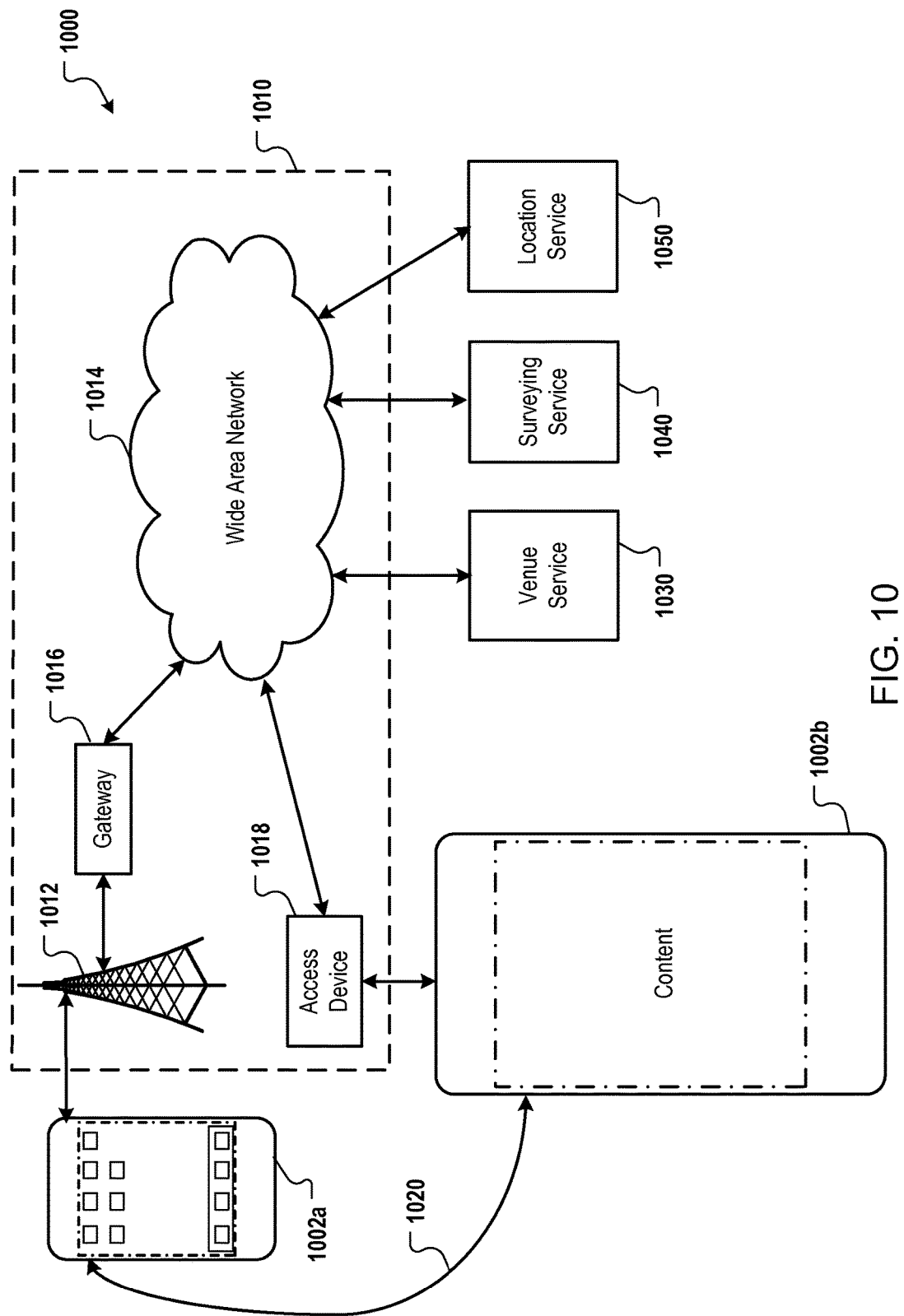
FIG. 10 is a block diagram of an example network operating environment for the mobile devices of FIGS. 1-9.

FIG. 10 is a block diagram of an example network operating environment 1000 for the mobile devices of FIGS. 1-9. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access point, can provide communication access to the wide area network 1014. Each of mobile devices 1002a and 1002b can be mobile device 102.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless mobile device 1002a can communicate with other wireless devices, e.g., other mobile devices, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030, 1040, and 1050 over the one or more wired and/or wireless networks. For example, one or more venue services 1030 can provide venue information to mobile devices 1002a and 1002b from a venue data source. The venue information can include venue identifiers associated with venue maps. Survey service 1040 can receive survey data from one or more survey devices and provide the survey data to location server 602. Location server 602 can provide location service 1050. Location service 1050 can include providing venue floor survey data and location fingerprints for venues to mobile devices 1002a and 1002b.

Mobile device 1002a or 1002b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

Example System Architecture

Figure 11:
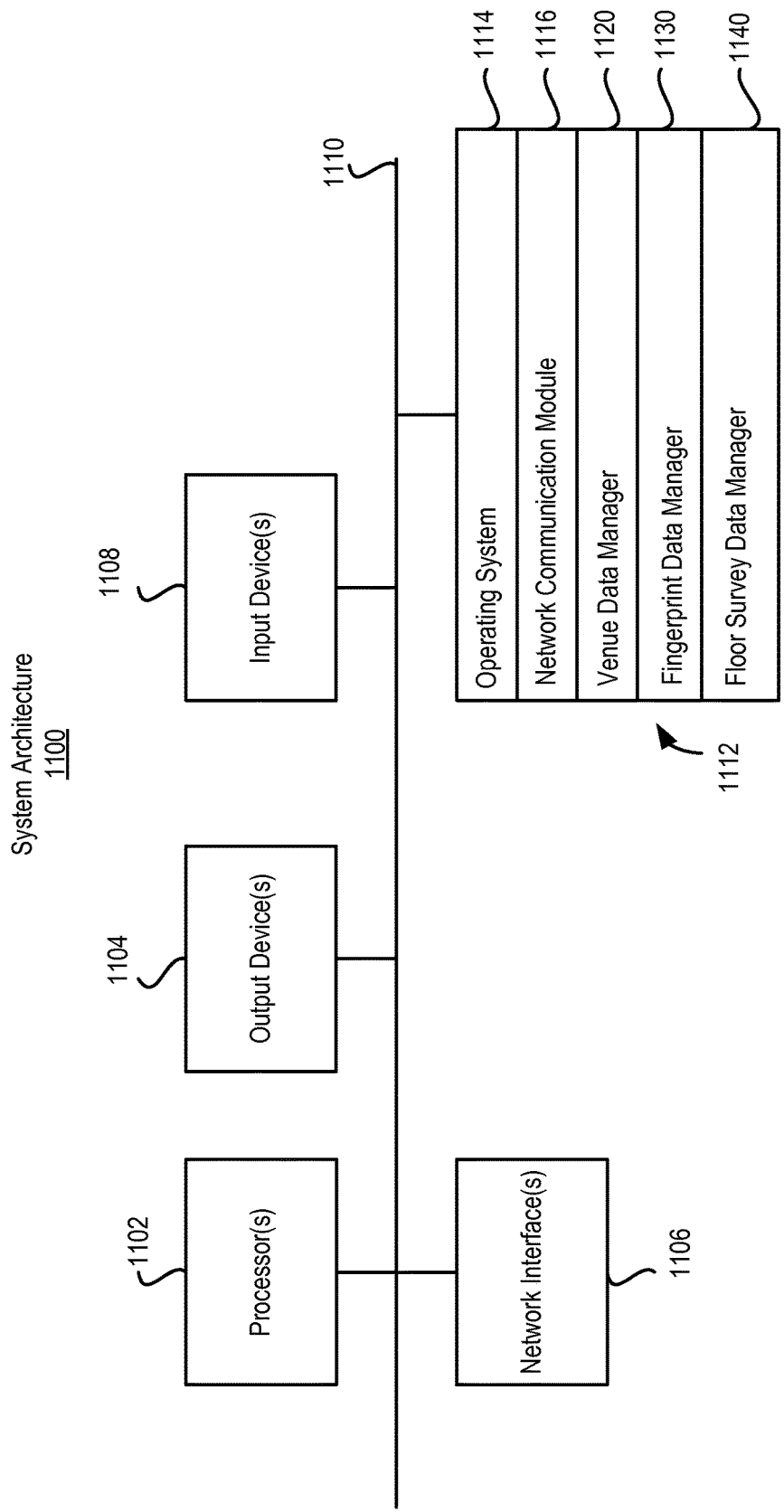
FIG. 11 is a block diagram of a system architecture for an example location server.

FIG. 11 is a block diagram of a system architecture for example location server 602. Other architectures are possible, including architectures with more or fewer components. In some implementations, architecture 1100 includes one or more processors 1102 (e.g., dual-core Intel® Xeon® Processors), one or more output devices 1104 (e.g., LCD), one or more network interfaces 1106, one or more input devices 1108 (e.g., mouse, keyboard, touch-sensitive display) and one or more computer-readable mediums 1112 (e.g., RAM, ROM, SDRAM, hard disk, optical disk, flash memory, etc.). These components can exchange communications and data over one or more communication channels 1110 (e.g., buses), which can utilize various hardware and software for facilitating the transfer of data and control signals between components.

The term "computer-readable medium" refers to a medium that participates in providing instructions to processor 1102 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1112 can further include operating system 1114 (e.g., a Linux® operating system), network communication module 1116, venue data manager 1120, fingerprint data manager 1130 and floor survey data manager 1140. Operating system 1114 can be multi-user, multiprocessing, multitasking, multithreading, real time, etc. Operating system 1114 performs basic tasks, including but not limited to: recognizing input from and providing output to devices 1106, 1108; keeping track and managing files and directories on computer-readable mediums 1112 (e.g., memory or a storage device); controlling peripheral devices; and managing traffic on the one or more communication channels 1110. Network communications module 1116 includes various components for establishing and maintaining network connections (e.g., software for implementing communication protocols, such as TCP/IP, HTTP, etc.).

Venue data manager 1120 can include computer instructions that, when executed, cause processor 1102 to perform functions of receiving venue data including venue map from venue data source 608, and providing the venue data to mobile device 102. Fingerprint data manager 1130 can include computer instructions that, when executed, cause processor 1102 to perform operations of determining a location fingerprint for each venue using data from survey data source 612. Venue floor survey data manager 1140 can include computer instructions that, when executed, cause processor 1102 to perform the operations of receiving floor survey data from survey data source 612, and providing the floor survey data to mobile device 102.

Architecture 1100 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
    receiving, by a mobile device, floor survey data for a venue that includes a plurality of floors, the floor survey data comprising a respective list of signal sources previously detected by a survey device at each floor, wherein each list is associated with respective statistical data representing a likely number of signal sources detected by the survey device;
    determining a respective probability score for each floor of the venue, including comparing a set of signal sources detected by the mobile device with each list of signal sources and determining each probability score based on a degree of match between the detected signal sources and each respective list, the degree of match being determined by the mobile device based on the likely numbers of signal sources;
    configuring a statistical filter, including determining a number of candidate locations for the floor according to the probability score; and
    determining, by the mobile device, a floor level in the venue on which the mobile device is located using the statistical filter and candidate locations on the floors in the venue.

2. The method of claim 1, wherein each signal source is a radio frequency (RF) signal transmitter, the statistical filter is a particle filter, and the candidate locations are particles of the particle filter.

3. The method of claim 1, wherein the statistical data representing a likely number comprises a minimum number of signal sources detected by the survey device and an average number of signal sources detected by the survey device.

4. The method of claim 3, wherein comparing the set of detected signal sources with each list comprises, for each list:
    determining a number of matching signal sources, the matching signal sources being signal sources that are in the list and the set of detected signal sources; and
    comparing the number of matching signal sources with the minimum number of signal sources and the average number of signal sources.

5. The method of claim 4, wherein determining a respective probability score for each floor of the venue comprises:
    designating a first marginal probability value for the floor upon determining that the number of matching signal sources is greater than or equal to the average number of signal sources;
    designating a second marginal probability value for the floor upon determining that the number of matching signal sources is less than the average number of signal sources but greater than or equal to the minimum number; and
    designating a third marginal probability value for the floor upon determining that the number of matching signal sources is less than the minimum number, wherein the first marginal probability value is higher than the second marginal probability value, and the second marginal probability value is higher than the third marginal probability value.

6. The method of claim 5, wherein the first marginal probability value is one, and the third marginal probability value is zero.

7. The method of claim 1, wherein configuring the statistical filter according to the probability scores comprises:
    computing a respective probability score for each floor based on the marginal probability values using Bayes' rule; and
    designating, for the statistical filter, a number of candidate locations for a floor corresponding to the probability score for the floor, wherein a higher probability score corresponds to a higher number of candidate locations.

8. The method of claim 7, wherein the number of candidate locations for a floor further corresponds to a size of the floor, wherein a larger size corresponds to a higher number of candidate locations for filtering.

9. The method of claim 7, wherein the number of candidate locations for a floor further corresponds to a location estimate, wherein a larger size corresponds to a proportionally higher number of candidate locations.

10. The method of claim 1, further comprising determining a change of floors based on a current floor level estimation and a likelihood of transiting from a current floor to a next floor.

11. A mobile device, comprising:
one or more processors; and
a non-transitory computer-readable medium storing instructions that, when executed by the one or more processors, cause the one or more processors to perform operations comprising:
receiving, by a mobile device, floor survey data for a venue that includes a plurality of floors, the floor survey data comprising a respective list of signal sources previously detected by a survey device at each floor, wherein each list is associated with respective statistical data representing a likely number of signal sources detected by the survey device;
determining a respective probability score for each floor of the venue, including comparing a set of signal sources detected by the mobile device with each list of signal sources and determining each probability score based on a degree of match between the detected signal sources and each respective list, the degree of match being determined by the mobile device based on the likely numbers of signal sources;
configuring a statistical filter, including determining a number of candidate locations for the floor according to the probability score; and
determining, by the mobile device, a floor level in the venue on which the mobile device is located using the statistical filter and candidate locations on the floors in the venue.

12. The mobile device of claim 11, wherein each signal source is a radio frequency (RF) signal transmitter, the statistical filter is a particle filter, and the candidate locations are particles of the particle filter.

13. The mobile device of claim 11, wherein the statistical data representing a likely number comprises a minimum number of signal sources detected by the survey device and an average number of signal sources detected by the survey device.

14. The mobile device of claim 13, wherein comparing the set of detected signal sources with each list comprises, for each list:
determining a number of matching signal sources, the matching signal sources being signal sources that are in the list and the set of detected signal sources; and
comparing the number of matching signal sources with the minimum number of signal sources and the average number of signal sources.

15. The mobile device of claim 14, wherein determining a respective probability score for each floor of the venue comprises:

designating a first marginal probability value for the floor upon determining that the number of matching signal sources is greater than or equal to the average number of signal sources;
designating a second marginal probability value for the floor upon determining that the number of matching signal sources is less than the average number of signal sources but greater than or equal to the minimum number; and
designating a third marginal probability value for the floor upon determining that the number of matching signal sources is less than the minimum number, wherein the first marginal probability value is higher than the second marginal probability value, and the second marginal probability value is higher than the third marginal probability value.

16. The mobile device of claim 15, wherein the first marginal probability value is one, and the third marginal probability value is zero.

17. The mobile device of claim 11, wherein configuring the statistical filter according to the probability scores comprises:
computing a respective probability score for each floor based on the marginal probability values using Bayes' rule; and
designating, for the statistical filter, a number of candidate locations for a floor corresponding to the probability score for the floor, wherein a higher probability score corresponds to a higher number of candidate locations.

18. The mobile device of claim 17, wherein the number of candidate locations for a floor further corresponds to a size of the floor, wherein a larger size corresponds to a higher number of candidate locations for filtering.

19. The mobile device of claim 17, wherein the number of candidate locations for a floor further corresponds to a location estimate, wherein a larger size corresponds to a proportionally higher number of candidate locations.

20. A non-transitory computer-readable medium storing instructions that, when executed by one or more processors, cause the one or more processors of a mobile device to perform operations comprising:
receiving, by a mobile device, floor survey data for a venue that includes a plurality of floors, the floor survey data comprising a respective list of signal sources previously detected by a survey device at each floor, wherein each list is associated with respective statistical data representing a likely number of signal sources detected by the survey device;
determining a respective probability score for each floor of the venue, including comparing a set of signal sources detected by the mobile device with each list of signal sources and determining each probability score based on a degree of match between the detected signal sources and each respective list, the degree of match being determined by the mobile device based on the likely numbers of signal sources;
configuring a statistical filter, including determining a number of candidate locations for the floor according to the probability score; and
determining, by the mobile device, a floor level in the venue on which the mobile device is located using the statistical filter and candidate locations on the floors in the venue.

* * * * *